Patented Apr. 16, 1946

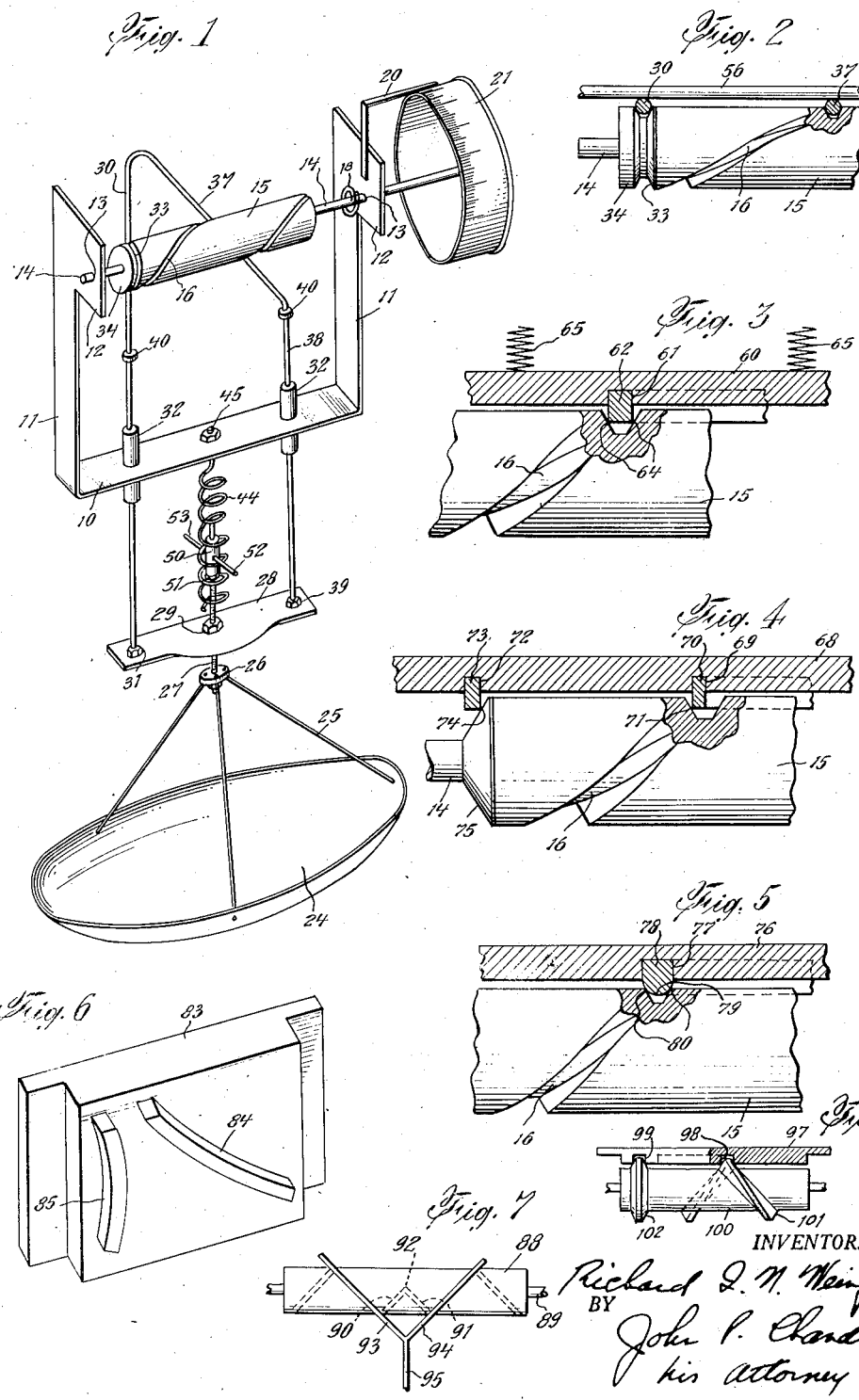

2,398,607

UNITED STATES PATENT OFFICE 2,398,607

MEASURING INSTRUMENT MOVEMENT

Richard I. N. Weingart, Glen Head, N. Y.

Application May 14, 1943, Serial No. 487,043

7 Claims. (Cl. 74—89)

This invention relates to an improved movement for use in measuring instruments generally, and has for its principal object the provision of improved means for translating movement of some kind of element which is responsive to changes in conditions into rotary movement in an indicator shaft. The present invention is particularly suited for use in connection with a weighing scale, although it is useful in the measuring instrument field generally, and will have other uses as well. The instant application constitutes a continuation of my co-pending application Ser. No. 434,845, filed March 16, 1942.

In weighing scales other than those of the beam type, the platform for the load is supported by suitable linkage, and the downward movement of the platform is imparted to the indicating mechanism. Interposed at some point in the system is some suitable resistant means which may comprise a spring element or a pendulous mass. In the devices of the art, the straight-line movement of the platform is generally converted into rotary motion of the indicator shaft by means of a conventional rack-and-pinion arrangement, or other equivalent means. The extreme sensitivity of a rack and pinion to errors in construction, or to foreign material, or to wear, is appreciated by those familiar with dial-type scales, and it is one of the principal objects of the present invention to provide an improved type of movement wherein certain objections to the rack-and-pinion movement are eliminated.

Another object of the present invention is the provision of a weighing scale or other measuring instrument which is provided with a movement of greater accuracy than is generally possible with the rack-and-pinion type. To this end the present invention includes a driven element, usually mounted on the indicator shaft, comprising a generally cylindrical member formed with a helical recess or a helical fin or thread having a substantially uniform lead angle from end to end. The driving element, which is carried by a longitudinally-movable member, comprises a single toothed member having a single driving surface, which is preferably, though not necessarily, a development of the contacted helical surface of the driven element. In other words, this driving surface may be a straight line. In the event that the driven element is formed with a helical recess, either or both of the opposed surfaces may be driven surfaces, and if both are employed it will then be appreciated that two surfaces of the driving element are likewise employed, in which case the width of the driving element is substantially the same as that of the recess in the driven element at the points of contact, in order that there will be little or no free play between these several surfaces. These opposed surfaces in the driven element are preferably non-parallel with each other.

In the event that only one surface of the driving element is desired to be used, such surface will bear against only one wall of the recess, and accordingly will rotate the pointer shaft in one direction only, opposite rotation being effected by means of a hair spring or other conventional means of this general character, or even by gravity. Substantially the same arrangement may be employed in the event that the driven element is formed with an external fin or thread. The single driving surface is, in many cases, preferable, since uniform wear between the two cooperating surfaces has no effect upon the accuracy of the instrument, particularly if it is normally used throughout its complete range. Furthermore, there is provided a true rolling action between the two cooperating surfaces.

In a movement of this character, the force which the driving element exerts on the driven element has two components, one of which is a thrust parallel with the axis of the driven shaft, tending to move the driven shaft longitudinally of its axis. In the present invention, this thrust is transmitted through a thrust-transmitting element to a second driving member carried by, or arranged to move with, the first-mentioned driving member. The thrust-transmitting element may comprise a member formed with an annular recess carried on the driven shaft. This arrangement restrains any longitudinal movement of the driven shaft relative to its axis, and the second driving member also imparts driving action to the driven shaft due to a frictional driving action between it and the thrust-transmitting element. In the event that the first driving member rotates the shaft in one direction only, opposite rotation being effected by means of a hair spring, or otherwise, this thrust-transmitting element may comprise a fixed bushing carried by the driven shaft with a single thrust surface, preferably a tapered one, rather than the annular recess first mentioned.

It will accordingly be apparent that most of the difficulties incidental to the rack-and-pinion arrangement, such as worn teeth, poor alignment, the presence of foreign particles, and the like, are considerably reduced. Moreover, a great measure of initial accuracy can be easily obtained with the present improved device, since no difficulty is experienced in forming the helical recess or fin with a completely uniform lead angle from end to end, and the construction of the driving element is, of course, the very essence of simplicity.

In a scale having a spring resistant, the expansion or contraction of such resistant is not uniform over its entire operating range. Where a rack-and-pinion type of transmission is used, it is difficult to compensate for this error. The movement of the present invention permits compensation of this kind to be easily accomplished.

The invention is illustrated schematically in the accompanying drawing which is intended to show a number of the obviously many uses to which the invention may be put. It may be utilized in virtually every type of weighing scale, regardless of whether a pendulous mass, a spring, or other means are employed for the resistant, and it may also be used in connection with many other types of industrial instruments, including those requiring a high multiplication of movement or no multiplication at all.

In the drawing:

Fig. 1 is a perspective view of a weighing scale embodying the movement of the present invention.

Fig. 2 is a broken plan view of a portion of a modified movement.

Figs. 3, 4 and 5 are broken plan views, partially in section, of alternative forms of driving and driven elements.

Fig. 6 is a perspective view of an alternative form of driving element.

Fig. 7 shows a front elevation of a modified form of movement.

Fig. 8 is a plan view of another form of the invention wherein the driving member is formed with recesses rather than threads or fins, and the driven member is formed with the threads or fins rather than the recesses.

The present invention may be used in connection with a weighing scale, which is illustrated in Fig. 1. The structure includes a substantially U shaped frame 10 provided with vertical portions 11 having inwardly-disposed ears 12 at their upper ends. The frame 10 may be rigidly supported in any desired manner. Inwardly-turned ears 12 are provided with aligned apertures 13 which receive and form a journal support for a driven shaft 14 which carries the helical element 15. This helical element 15 may be separately formed and mounted on shaft 14, or it may be formed integrally with shaft 14. The helical element is generally cylindrical in shape and is provided with a helical recess 16 having a generally uniform lead angle from end to end. The details of the cross-sectional contour of the recess will be discussed hereinafter.

A fixed indicator 20 is carried on the frame and at the adjacent end of shaft 14 a circular scale 21 is mounted, the scale having the usual markings to indicate the weight on the load platform. This load platform may take any desired form, and in the drawing is shown as comprising a tray 24 which is suspended by means of wires 25 to a plate 26 carried at the lower end of a threaded rod 27. This rod passes through a transverse beam 28, and is secured to such beam by means of lock nuts 29, one positioned above the beam, and one (not shown) below the beam.

The driving element, in this instance, is shown as being formed from a circular rod bent to a substantially inverted V shape. One leg 30 of the rod is secured at 31 at one end of the beam. The rod passes through a bearing bushing 32 rigidly secured on the transverse portion of U shaped support 10. The upper part of leg 30 engages a recess 33 formed in a thrust-transmitting element 34, also carried on shaft 14 adjacent to one end of the helical element 15. The thrust-transmitting element may, of course, be formed integrally with the helical element, although in accordance with the present practice in carrying out the invention, the helical element 15 and the shaft 14 are formed in a single piece in the following manner.

A relatively long length of the metal rod is first provided, and the helical recess is cut therein from end to end. This is done by a special machine which forms no part of the present invention, although it may, of course, be done on an ordinary lathe with an appropriate lead screw for moving the cutting tool. The long length of the rod with the helical recess cut therein is then cut to suitable lengths and the terminals machined down to form the shaft ends 14. In this instance, it is not suitable to form the thrust element integrally with the shaft and the helical element, for the obvious reason that the helical recess 16 should not run into, or cross through, the recess 33. Accordingly, the thrust element 34 is formed as a separate bushing and is force-fitted on the shaft or otherwise keyed thereto, although it may, of course, be free to rotate upon such shaft. Leg 30 of the driving element is preferably straight throughout its length.

The driving element further comprises a straight, diagonally-disposed driving portion 37 which lies at an angle disposed generally to the lead angle of the helical recess 16. Below driving portion 37 is the opposite leg 38 which passes through and is free to move longitudinally in a second bearing bushing 32 mounted in frame member 10, and terminates at its lower end at 39 in the opposite end of beam 28. Stop members 40 limit the downward movement of the driving element.

The device further includes a coiled spring 44 which is secured at its upper end 45 to frame 10. It is engaged at its lower end by the following adjustable means. A generally cylindrical nut or bushing 50 is carried adjacent to the upper end of threaded rod 27. This may be moved up or down on the rod by turning the same. A lock nut 51 locks the bushing in any desired position. The bushing has aligned apertures therein which receive aligned pins 52 and 53, one of such pins engaging the upper surface of the spring, and the other pin engaging the lower surface at a higher point on the helix. The operation of the device is as follows.

As the load increases, beam 28 and the inverted V shaped driving element move downwardly against, however, the tension of spring 44. This downward movement produces rotation of the driven element 15. The driving element 37 exerts a thrust against the wall of the helical recess 16. This thrust has two components, one of which is in a direction parallel with the axis of shaft 14. This would tend to move the shaft longitudinally of its axis. This movement, however, is restrained by the thrust-receiving element 38. The annular recess 33 of the thrust-transmitting element 34 receives portion 30 of the driving element. The other component of the force exerted by driving element 37 produces rotation in the helical element 15. The driving portion 37 of the driving element is illustrated as being straight throughout its length. It is accordingly a development of the same helix as is the spiral 16, thus producing a true rolling action between the driving and driven elements. If thrust element 34 is keyed to shaft 14, as is preferred, portion 30 of the driving element also exerts a driving action to the driven element by friction. A hair spring may be connected to driven shaft 14 to take up backlash.

The scale may be calibrated by varying the effective length of spring 44. This is accomplished by moving bushing 50 carrying pins 52 and 53 upwardly or downwardly, it being understood that the shorter the effective length of the spring, the greater the tension, and vice versa. If, for instance, the fixed pointer 20 registers zero when the load platform is empty, and registers 190 lbs. when a known load of 200 lbs. is placed upon the load platform, it will be clear that the spring is too short, and by rotating the bushing 50 until the fixed pointer registers 200, the instrument will be calibrated. During the course of this calibration, the zero point also moves, and this is compensated for by an adjustment of lock nuts 29.

The arrangement shown in Fig. 1 comprises a suspension scale with the load platform at the lower end of the assembly. The entire apparatus may, of course, be inverted and the load platform placed on top. Accordingly, as the load increases, it exerts compressive action rather than tension on the spring. In the modified arrangement shown in Fig. 2, a transverse member 56 exerts a yielding action against driving elements 30 and 37, thus forcing them into firmer engagement with recesses 33 and 16, which may be desired in certain instances, thus eliminating the necessity for a hair spring.

The precise shape of the recess 16 in the driven element 15 is, of course, a matter of choice. In Fig. 3, this is illustrated as having opposed walls lying at an angle of approximately 30° to the vertical. In this instance, also, the driving element is shown as comprising a plate 60 having a recess 61 therein which receives a single elongated driving gear 62 which is generally rectangular in transverse section. The driving edges 64 of this driving element contact opposed walls of the recess, and accordingly, in this instance, the hair spring may be eliminated. In this instance, it will be preferred to provide some spring means 65 to yieldingly urge the driven element into engagement with the walls of the recess. Gear 62 may be formed from metal alloy or from non-metallic material, such as a plastic, in order to reduce friction.

In Fig. 4 the spiral recess 16 is similarly shaped, but in this case the driving element comprises the plate 68 formed with a recess 69 which receives driving gear 70, which may be substantially rectangular in transverse section, or it may have a rounded edge. In this case, however, the thickness of the driving gear is substantially less than the width of helical recess 16 at the point where the single driving edge 71 contacts one of the walls of the recess. In this instance, the driving element further includes another recess 72 which receives supporting gear 73, whose edge 74 contacts the surface of a tapered thrust-receiving element 75. Thus, gear 73 prevents movement of the driven element longitudinally of its axis in the direction of the longitudinal thrust exerted by gear 70, and in this instance a suitable hair spring may be provided for imparting opposite rotation to the driven element as such opposite rotation is permitted by non-driving movement of the driving unit.

Another arrangement is shown in Fig. 5 wherein the driven element 15 has the usual helical recess 16. In this case, however, the driving element consists of a plate 76 having a recess 77 which receives a driving gear 78 having a driving edge 79, which is generally semi-circular in transverse section, which, in this instance, contacts the opposed peripheral edges 80 of the helical recess rather than the walls of such recess at a point spaced inwardly from such edges.

The alternative driving element in Fig. 6 includes a block 83 which may be mounted in any suitable channels or slideways to permit longitudinal movement, the plate having on its forward face driving elements 84 and 85 which may be similar to driving elements 70 and 73 of Fig. 4, except that the driving faces or driving edges do not lie in a straight line, but rather are curved. The precise curvature is, of course, a matter of choice, and these surfaces may also be variable, thus permitting of compensation for non-uniform movement in the condition-responsive element. Either or both of the surfaces may, of course, be straight over a portion of their length and curved over another portion, or one may have two or more unaligned straight portions, all depending upon the results which it is desired to accomplish.

In the movement of Fig. 7, the driven element 88 is generally cylindrical in shape and is provided with shaft terminals 89. It further is formed with two oppositely-disposed helical recesses 90 and 91, which meet and terminate at their inner ends at point 92. The driving element, in this case, includes members 93 and 94 which are joined to a rod 95, which may be appropriately connected with the load platform, in the case of a scale, or to the condition-responsive means, in any other type of measuring instrument. In this instance, driving elements 93 and 94 are positioned at angles disposed to the lead angles of the helical recesses 90 and 91. It is not necessary, of course, that both helical recesses have the same lead angle.

In the alternative form of the invention shown in Fig. 8, the driving member 97 is formed with recesses 98 and 99 which correspond with the driving members 37 and 30 of Fig. 1, and the driven member 100 is formed with a helical fin 101 and an annular fin 102 which correspond to recesses 16 and 33 of Fig. 1. It will be appreciated that this alternative form of the invention is an obvious modification of the invention, inasmuch as the use of the male or female driving elements, or the use of the female or male driven elements, respectively, is a matter of choice, and in the appended claims the language used is intended to cover either type of structure. Moreover, it is clear that if the recess in the helical element is wide enough, there is formed a fin or thread. Likewise, in the showing of Fig. 8, the annular fin 102, replacing the annular recess 33 of Fig. 1, really constitutes an external thread with a zero lead.

It is of interest to note in connection with the arrangement of Fig. 8, that the driving contact is an edge of the driving element contacting the surface of the helical driven element. In the arrangement of Fig. 5, the driving contact is a surface of the driving element contacting the edge of the driven helical element. This form is novel and highly advantageous in certain instances wherein the driven member is a helical element. The edge of the driving element of Fig. 8, or the edge of the driven element of Fig. 5, need not necessarily be sharp edges. Inasmuch as the surface or line of contact of the driving element 37 of Fig. 1 is preferably a development of the line or surface contacted in the helical recess or thread, this relationship is one where the driving element lies at an angle disposed to the lead angle of the helical element. It is not necessary for this relationship to be mathematically exact. It should, however, be generally true to avoid excessive friction between the driving and driven surfaces. This relationship of the driving member has been variously referred to in the appended claims as lying at an angle disposed generally to the lead angle of the helical driven element.

A number of specific embodiments of the present invention have been illustrated and described herein, but it will be appreciated that these are only a few of the possible forms of the invention.

What I claim is:

1. A movement for a measuring instrument, said movement comprising a helical driven element and a driving member therefor, said driving member moving in a plane generally tangent to a pitch cylinder of the helical element, and means for restraining movement of the driven element longitudinally of its axis comprising a thrust element carried by the shaft and a second member, movable with the driving member, contacting said thrust element.

2. A movement for a measuring instrument, said movement comprising a helical driven element, and a driving element comprising a driving member formed with a driving face which contacts the helical element and produces rotation thereof by exerting a thrust against the helical surface, said driving element moving in a plane generally tangent to a pitch cylinder of the driven element, a driven shaft associated with the helical element, means for mounting the driving member permitting reciprocating movement thereof in said plane, and means for opposing movement of the shaft longitudinally of its axis comprising a thrust-receiving element carried by the shaft and a second member associated with the driving member contacting said thrust-receiving element.

3. A movement for a measuring instrument, said movement comprising a driven shaft, a helical element associated with the driven shaft, a reciprocating driving member formed with a driving face which exerts a force against such helical element to rotate the same, said driving member moving in a plane generally tangent to a pitch cylinder of the helical element, a thrust element positioned on the driven shaft, and a supporting member associated with the driving member and formed with a face which contacts the thrust element during reciprocating movement of said supporting member and opposes longitudinal movement of the shaft.

4. A movement for a measuring instrument, said movement comprising a driven shaft, a helical element associated with the driven shaft, driving means comprising a pair of associated members including a driving member and a thrust-receiving member, means for mounting the associated members to permit longitudinal reciprocating movement thereof, both of said associated members having edges which lie in a plane which is generally tangent to a pitch cylinder of the helical element, the driving edge of the driving member being disposed generally to the lead angle of the helical element and contacting a face of such element, and causing rotation thereof in one direction by exerting a force against such helical element, one component of such force being a thrust parallel with the axis of such element, spring means for rotating the helical element and the driven shaft in the opposite direction, means for opposing such thrust parallel to the axis of the helical element and driven shaft, comprising the thrust-receiving member, and a thrust element carried by the shaft, the thrust-receiving member contacting such thrust element.

5. A movement for a measuring instrument, said movement comprising a driven shaft, a helical element associated with the driven shaft, a longitudinally movable, reciprocating driving member formed with an elongated driving face lying on an angle generally disposed to the lead angle of the helical element, and exerting a force on such helical element to rotate the same in one direction, and spring means for rotating the shaft in the opposite direction, said driving member moving in a plane generally tangent to a pitch cylinder of the helical element, a thrust element associated with the driven shaft, and a thrust-receiving member carried by the driving member and formed with a thrust-receiving face lying in a single plane at right angles to the axis of the driven shaft, such thrust-receiving face contacting the thrust element and opposing such thrust as is parallel to the axis of the helical element.

6. A movement for a measuring instrument, said movement comprising a helical driven element, and a driving member formed with a driving face, and a driven shaft associated with the helical element, means for mounting the driving member to permit longitudinal, reciprocating movement thereof in a plane generally tangent to a pitch cylinder of the helical driven element, spring means for rotating the driven shaft in one direction, the driving member rotating said shaft in the opposite direction by exerting a force against the helical element, and means for opposing the thrust parallel to the axis of the helical element caused by such force, such means comprising a thrust element carried by the shaft, and a thrust-receiving member associated with the driving member contacting said thrust element.

7. A movement for a measuring instrument, said movement comprising a driven shaft, a helical element associated with the driven shaft, driving means comprising a driving member and a thrust-receiving member, means for mounting said members to permit longitudinal, reciprocating movement thereof in a plane generally tangent to a pitch cylinder of the helical driven element, the driving edge of the driving member being disposed generally to the lead angle of the helical element and contacting a face of such element, and causing rotation thereof by exerting a thrust against such face, and means for restraining movement of the helical element longitudinally of its axis, comprising a thrust element carried by the driven shaft, the thrust-receiving member contacting such thrust element.

RICHARD I. N. WEINGART.